United States Patent [19]

Mayer

[11] Patent Number: 4,619,045
[45] Date of Patent: Oct. 28, 1986

[54] HEDGE TRIMMER

[75] Inventor: Günter Mayer, Untereisesheim, Fed. Rep. of Germany

[73] Assignee: Andreas Stihl, Waiblingen, Fed. Rep. of Germany

[21] Appl. No.: 717,459

[22] Filed: Mar. 29, 1985

[30] Foreign Application Priority Data

Jun. 26, 1984 [DE] Fed. Rep. of Germany ... 8419115[U]

[51] Int. Cl.[4] ............................................. B26B 19/02
[52] U.S. Cl. .......................................... 30/216; 30/223
[58] Field of Search ................. 30/210, 215, 216, 217, 30/200, 382, 209, 213, 214, 221, 222, 223, 224

[56] References Cited

U.S. PATENT DOCUMENTS

| | | | |
|---|---|---|---|
| 1,039,021 | 9/1912 | Bullock | 30/216 |
| 1,128,765 | 2/1915 | Day | 30/213 X |
| 2,674,795 | 4/1954 | Long | 30/216 |
| 3,293,746 | 12/1966 | Maxson | 30/223 |
| 3,808,684 | 5/1974 | Ludwig | 30/382 |
| 4,216,582 | 8/1980 | Paule et al. | 30/216 |

FOREIGN PATENT DOCUMENTS 1421738 1/1976 United Kingdom ................. 30/200

Primary Examiner—Jimmy C. Peters
Attorney, Agent, or Firm—Walter Ottesen

[57] ABSTRACT

The invention is directed to a hedge trimmer having a pair of elongated cutters journalled for reciprocal movement. The two movable cutters are journalled on a guide bar so as to be movable in the longitudinal direction thereof and include cutting teeth which extend transversely to the direction of movement. Protective teeth are arranged with respect to the guide bar and are arranged next to the cutting teeth so as to be parallel thereto. The protective teeth are configured to be so long that the free end portions thereof project outwardly beyond the outer edges of the cutting teeth.

20 Claims, 4 Drawing Figures

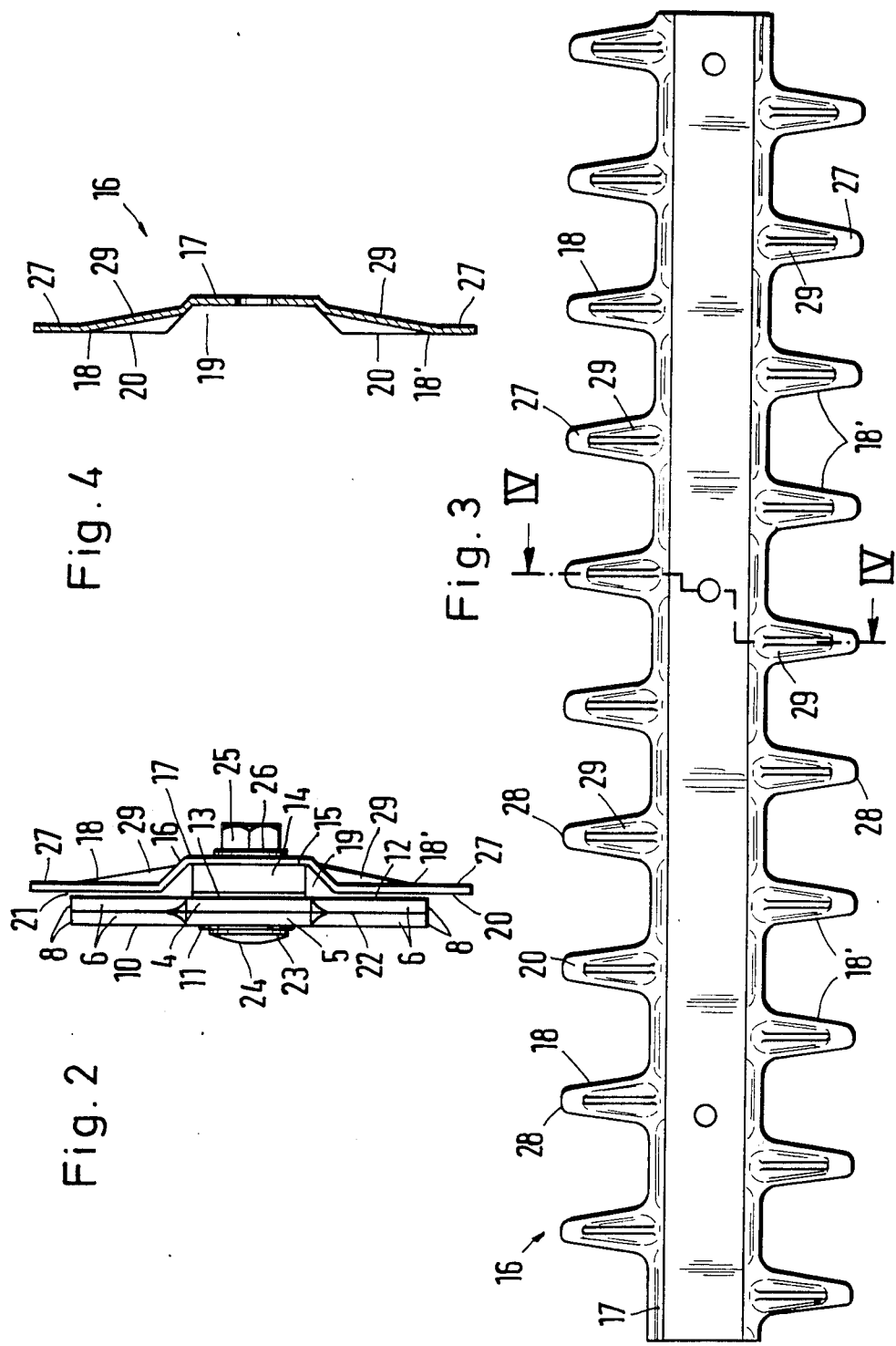

HEDGE TRIMMER

FIELD OF THE INVENTION

The invention relates to a hedge trimmer which includes a housing, a guide bar mounted on the housing and defining a longitudinal axis, and a pair of elongated cutters journalled for reciprocal movement on the guide bar in the direction of the axis.

BACKGROUND OF THE INVENTION

Published German patent application DE-OS No. 27 52 234 discloses a hedge trimmer wherein the cutting teeth of the first movable cutter are at least twice as long as the teeth of the second movable cutter. The overlapping ends of the teeth are widened so that the manufacture thereof is relatively complex. A significant disadvantage of this arrangement is that no adequate protection against injury to the operator is provided because of the reciprocating movement of the widened teeth. In the event that the reciprocating cutter with the widened teeth comes, for example, into inadvertent contact with the thigh of the operator, the danger exists of a very severe injury since the reciprocating teeth can cause so-called blunt lacerations.

SUMMARY OF THE INVENTION

In view of the above, it is an object of the invention to provide a hedge trimmer affording protection to the operator against injury of the kind mentioned above. It is a further object of the invention to provide a hedge trimmer which affords effective protection against both cuts and lacerations to the operator such as could otherwise occur, for example, by the inadvertent loss of control of the unit.

The hedge trimmer according to the invention includes: a housing; guide bar means mounted on the housing and defining a longitudinal axis; a pair of elongated cutters journalled for reciprocal movement on the guide bar means; reciprocating drive means for reciprocating the cutters in mutually opposing movement along the longitudinal axis. Each of the cutters has a plurality of cutting teeth projecting laterally of the longitudinal axis and the guide bar means includes a plurality of protective teeth projecting laterally of said axis which are arranged so as to be parallel and adjacent to the cutting teeth. The protective teeth have respective end portions which overlap and project outwardly beyond the cutting teeth.

BRIEF DESCRIPTION OF THE DRAWING

The invention will now be described with reference to the drawing wherein:

FIG. 2 is a view of the cutter assembly taken in the direction along arrow II of FIG. 1 showing the front end of the cutter assembly;

FIG. 3 is a side elevation view of the cover bar with the protective teeth of the hedge trimmer of FIG. 1; and, FIG. 4 is a section view of the cover bar taken along the line IV—IV of FIG. 3.

DESCRIPTION OF THE PREFERRED EMBODIMENTS OF THE INVENTION

Figure 1:
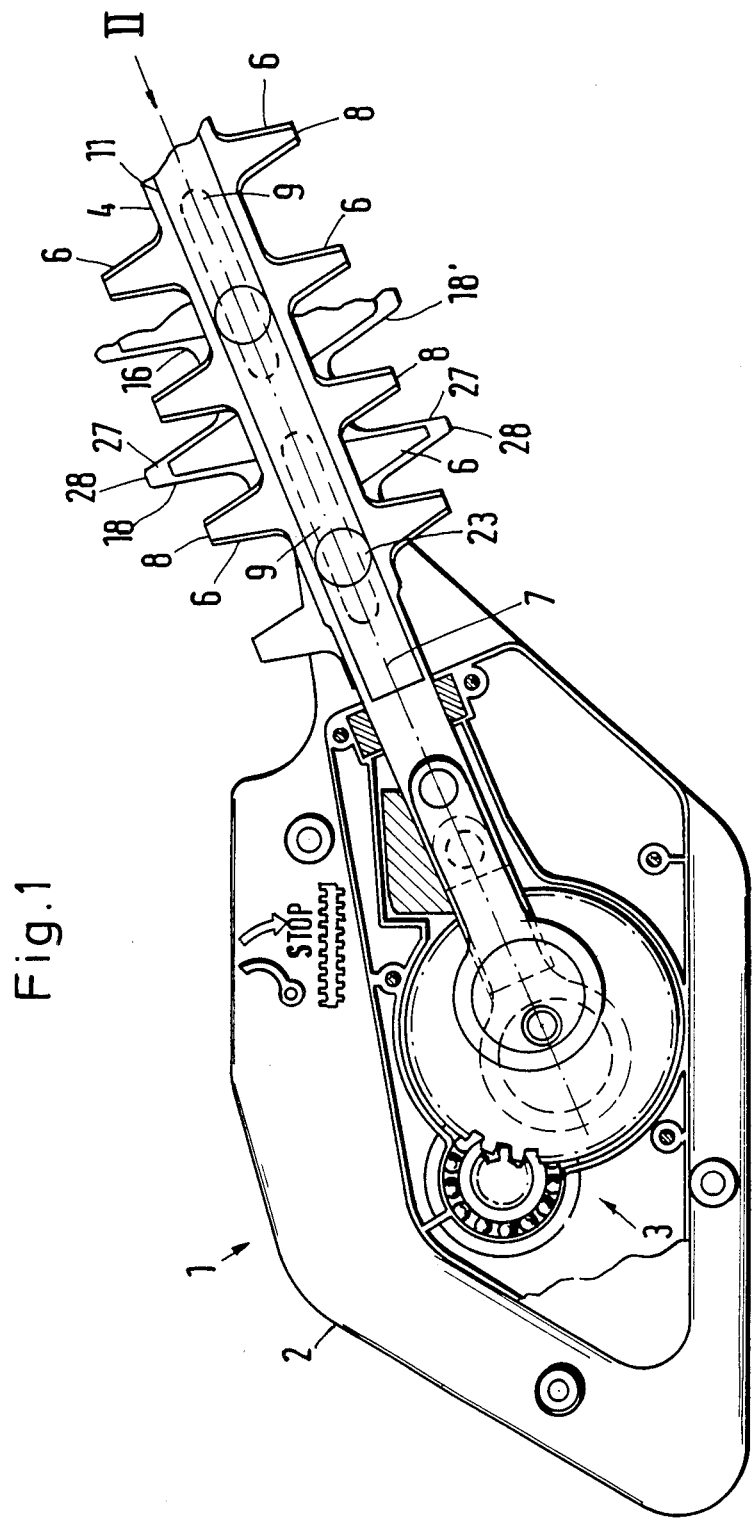
FIG. 1 is a side elevation view of the hedge trimmer according to the invention with the outer portion of the cutter assembly omitted.

Referring to FIG. 1, the hedge trimmer 1 includes a drive motor mounted in a motor housing 2 which is preferably an internal combustion engine and which drives two cutters 4, 5 lying side by side in parallel via drive means 3. The cutters 4, 5 are driven so as to reciprocate in mutually opposing movement in the longitudinal direction of the cutter assembly.

The two movable cutters 4, 5 include cutting teeth 6 which extend transversely to longitudinal axis 7 of the cutters 4, 5 so as to project to the left and to the right of this axis as shown. The cutting teeth have a trapezoidal configuration such that the width at the free cutting end 8 of each cutting tooth 6 is smaller than the base thereof. The two mutually adjacent rows of cutting teeth of each cutter 4, 5 are displaced with respect to each other so that the cutting teeth of one row lie opposite the tooth gaps of the other row.

Longitudinal slots 9 are formed in the cutters 4, 5. A thin glide rail 11 lies against the outer surface 10 of the cutter 5; whereas, a thin metal spacer 13 is disposed at the opposite lying outer surface 12 of cutter 4. The thin metal spacer 13 lies against a fixedly mounted guide bar 14 of the hedge trimmer 1 (FIG. 2).

Furthermore, a cover bar 16 lies against the side surface 15 of guide bar 14 which faces away from the cutters 4, 5. The cover bar 16 includes a base 17 configured so that it is approximately U-shaped when viewed in cross section and which has a plurality of protective teeth 18, 18' extending in mutually opposing directions therefrom. The U-shaped configuration of the base 17 causes the latter to define a depression 19 wherein the guide bar 14 is disposed. The thickness of the guide bar 14 corresponds substantially to the depth of the depression 19.

FIG. 2 shows that in this embodiment of the invention, a very narrow glide gap 21 is formed between the outer surface 12 of the cutter 4 and the inner surface 20 of the protective teeth 18, 18' so that here practically no sliding friction can occur. However, glide gap 21 is so small that no substances can accumulate whereby a jamming or other such action can be prevented in every instance. However, it is possible to reduce the glide gap 21 to zero or approximately to zero by eliminating the thin metal spacer so that the inner surface 20 of the protective teeth 18, 18' lies against the outer surface 12 of the cutting teeth 6 without pressure.

The two cutters 4, 5 which lie against each other with their cutting surfaces 22 are connected with the glide bar 11, the metal spacer 13, the guide bar 14 and the cover bar 16 with the aid of threaded fasteners 23 so as to conjointly define the cutter assembly. The head 24 of the threaded fastener 23 lies against the glide bar 11; whereas, a threaded nut 25 presses against the outer side of the cover bar 16 via a collar 26. The threaded bolt 23 penetrates the cutters 4, 5 in the elongated slots 9 so that both cutters 4, 5 can freely move reciprocally and yet be guided.

FIG. 1 shows that the protective teeth 18, 18' of the cover bar 16 have substantially the same trapezoidal shape as the cutting teeth 6 of the cutters 4, 5. The width of the protective teeth 18, 18' is the same as the width of the cutting teeth 6 when viewed in the longitudinal direction of the guide bar 14. Furthermore, the protective teeth 18, 18' have, in their respective rows, the same spacing between each two mutually adjacent teeth as do the cutting teeth 6 of the cutters 4, 5.

FIGS. 1 and 2 show that the protective teeth 18, 18' of the cover bar 16 secured to the guide bar 14 are configured so as to be longer than the cutting teeth 6 of the cutters 4, 5. The protective teeth 18, 18' are configured so that the free end portions 27 thereof extend beyond the outer edge 8 of the cutting teeth 6 by an amount corresponding to approximately one third of the length of the cutting teeth 6.

FIG. 3 shows that the protective teeth 18, 18' of the cover bar 16 are also arranged in two rows so that the protective teeth of one row project in a direction opposite to the protective teeth of the other row. The protective teeth of the one row are displaced by a half tooth gap with respect to the protective teeth of the other row. The one row of teeth 18 are therefore disposed opposite tooth gaps of the teeth 18' of the other row.

In order to substantially optimize the protection against injury, the end portions 27 of the protective teeth 18, 18' are provided with a rounded edge 28 so that no sharp cornered edges are present. In the embodiment of the invention shown, the cover bar 16 with its base 17 and protective teeth 18, 18' is made of relatively thin light aluminum sheet metal and is configured so as to be a stamping part which can be manufactured in a single working step at favorable cost. Accordingly, a one piece component made of the same material throughout is provided.

The protective teeth 18, 18' include reinforcement ribs 29 causing the protective teeth 18, 18' to have a high toughness even when the component is manufactured from a thin metal sheet. For this purpose, the ribs 29 are configured so as to be arcuate from the outward side of the protective teeth 18, 18' and extend in the longitudinal direction of the teeth from the projecting end portion 27 toward the base 17 of the cover bar 16. The width of the reinforcement ribs 29 is thicker at the foot of the protective teeth than it is in the vicinity of the end portion 27.

Furthermore, it is within the scope of the invention that the protective teeth 18, 18' can be integrated directly into the guide bar 14 so that the guide bar 14 together with protective teeth 18, 18' can be made in one piece and of the same material throughout. An embodiment of this kind equipped with protective teeth integrated into the guide bar 14 can be advantageously realized by the hedge trimmers equipped with reciprocating cutters which are to be newly manufactured. The use of a cover bar 16 provided with protective teeth 18, 18' and mounted on the guide bar 14 affords the advantage of an especially economical manufacture and retrofit for hedge trimmers already manufactured. The cover bar 16 with the protective teeth 18, 18' need only be mounted on the available guide bar 14 with threaded fasteners.

With the protective teeth 18, 18' fixedly arranged on the stationary guide bar of a hedge trimmer with reciprocating cutters according to the invention, an important measure is provided to protect against cuts and/or lacerations when performing work with the hedge trimmer 1 equipped with reciprocating cutters. With the protective teeth 18, 18', a further significant advantage is provided in that the protective teeth 18, 18' provide an additional support so that a more effective cutting action is provided when working with the hedge trimmer 1.

It is understood that the foregoing description is that of the preferred embodiments of the invention and that various changes and modifications may be made thereto without departing from the spirit and scope of the invention as defined in the appended claims.

What is claimed is:

1. A hedge trimmer comprising:

a housing;

a guide bar having two flat sides and being mounted on said housing, the guide bar defining a longitudinal axis;

a pair of elongated flat cutters journalled for reciprocal movement on one of the flat sides of said guide bar so as to cause one of said cutters to be sandwiched between said one flat side and the other one of said cutters;

reciprocating drive means for reciprocating said cutters in mutually opposing movement along said axis;

each of said cutters having a plurality of cutting teeth projecting laterally of said axis;

an elongated cover mounted on said guide bar and being formed to define a substantially U-shaped channel having an elongated recess for accommodating said guide bar therein;

said cover having a plurality of protective teeth projecting laterally and outwardly from the legs of said channel so as to be parallel and adjacent to said cutting teeth;

said protective teeth having respective end portions overlapping and projecting outwardly beyond said cutting teeth; and, said channel having a depth corresponding substantially to the thickness of said guide bar so as to cause said one flat side to be flush with said protective teeth and to place said one cutter directly next to said protective teeth thereby defining a very narrow glide cap between said one cutter and said protective teeth so that practically no sliding friction can occur therebetween.

2. The hedge trimmer of claim 1, the spacing in the direction of said axis between adjacent ones of said protective teeth being substantially the same as the spacing in the direction of said axis between adjacent ones of said cutter teeth.

3. The hedge trimmer of claim 2, the width in the direction of said axis of said protective teeth being substantially the same as the width of said cutter teeth.

4. The hedge trimmer of claim 1, said end portions extending outwardly beyond the outer tips of said cutter teeth by an amount corresponding to $\frac{1}{4}$ to $\frac{1}{2}$ of the length of said cutting teeth.

5. The hedge trimmer of claim 1, said cutting teeth having a trapezoidal configuration and said protective teeth having a trapezoidal configuration substantially the same as said cutting teeth.

6. The hedge trimmer of claim 1, said elongated metal cover and said protective teeth being made of the same material and configured as a single integral piece.

7. The hedge trimmer of claim 1, said cover being made of metal and further comprising reinforcement rib means for reinforcing said protective teeth.

8. The hedge trimmer of claim 7, said rib means being a plurality of ribs for reinforcing corresponding ones of said protective teeth, each of said ribs being configured so as to extend upwardly from the outer end of the protective tooth to the leg of said U-shaped channel from which said protective tooth laterally projects.

9. A hedge trimmer comprising:
a housing;
guide bar means mounted on said housing and defining a longitudinal axis;
a pair of elongated cutters journalled for reciprocal movement on said guide bar means;
reciprocating drive means for reciprocating said cutters in mutually opposing movement along said axis;
each of said cutters having a plurality of cutting teeth projecting laterally of said axis;
said guide bar means including a plurality of protective teeth projecting laterally of said axis and arranged so as to be parallel and adjacent to said cutting teeth; and,
said protective teeth having respective end portions overlapping and projecting outwardly beyond said cutting teeth;
a first number of said plurality of protective teeth being arranged in a first row along said axis so as to be directed outwardly therefrom to the lefthand side thereof and the remainder of said plurality of protective teeth being arranged in a second row along said axis so as to be directed outwardly therefrom to the righthand side thereof, the protective teeth of said first row being displaced from the protective teeth of said second row by an amount equal to one-half of the spacing between adjacent ones of said cutter teeth.

10. The hedge trimmer of claim 9, said end portions of said protective teeth having respective rounded edges.

11. The hedge trimmer of claim 9, said guide bar means comprising a guide bar mounted on said housing, said cutters being journalled for reciprocal movement on said guide bar, said guide bar and said protective teeth being configured as a single piece.

12. A hedge trimmer comprising:
a housing;
guide bar means mounted on said housing and defining a longitudinal axis;
a pair of elongated cutters journalled for reciprocal movement on said guide bar means;
reciprocating drive means for reciprocating said cutters in mutually opposing movement along said axis;
each of said cutters having a plurality of cutting teeth projecting laterally of said axis;
said guide bar means including a plurality of protective teeth projecting laterally of said axis and arranged so as to be parallel and adjacent to said cutting teeth; and,
said protective teeth having respective end portions overlapping and projecting outwardly beyond said cutting teeth;
said guide bar means including a guide bar mounted on said housing; and, a cover bar mounted on said guide bar, said protective teeth being arranged on said cover bar, said cover bar and said protective teeth being made of the same material and configured as a single integral piece;
said cover bar having an elongated base extending in the direction of said axis and said protective teeth extending laterally from said base, said guide bar having an elongated side surface likewise extending in the direction of said axis; and, said guide bar means further comprising fastener means for fixedly mounting said cover bar to said guide bar at said side surface.

13. The hedge trimmer of claim 12, said elongated base having an approximately U-shaped cross section defining an elongated recess for accommodating said guide bar therein.

14. The hedge trimmer of claim 12, said cutters being reciprocally journalled to said guide bar one atop the other so as to cause the outer surface of the cutter teeth of one of said cutters to be directly and tightly next to the inner surface of said protective teeth.

15. The hedge trimmer of claim 13, said cutters being reciprocally journalled to said guide bar one atop the other so as to cause the outer surface of the cutter teeth of one of the cutters to be adjacent the inner surface of said protective teeth, said guide bar means comprising a thin metal spacer disposed between said one cutter and said cover bar so as to define a narrow glide gap between the outer surface of the cutter teeth of said one cutter and the inner surface of said protective teeth.

16. The hedge trimmer of claim 12, said cover bar comprising said base and said protective teeth being configured as a sheet metal stamping.

17. The hedge trimmer of claim 16, said stamping being made of aluminum.

18. The hedge trimmer of claim 16, said cover bar further comprising reinforcement rib means for reinforcing said protective teeth.

19. The hedge trimmer of claim 18, said rib means being a plurality of ribs for reinforcing corresponding ones of said protective teeth, each of said ribs being arcuately configured upwardly from the outer side of the protective tooth and extending from said base to the end portion of the protective tooth.

20. A hedge trimmer comprising:
a housing;
a flat guide bar mounted on said housing and defining a longitudinal axis;
a pair of elongated flat cutters journalled for reciprocal movement on one of the flat sides of said guide bar;
reciprocating drive means for reciprocating said cutters in mutually opposing movement along said axis;
each of said cutters having a plurality of cutting teeth projecting laterally of said axis;
an elongated sheet metal cover configured as a metal stamping mounted on said guide bar and being formed to define a substantially U-shaped channel having an elongated recess for accommodating said guide bar therein;
said sheet metal cover having a plurality of protective teeth projecting laterally and outwardly from the legs of said channel so as to be parallel and adjacent to said cutting teeth; and,
said protective teeth having respective end portions overlapping and projecting outwardly beyond said cutting teeth.

* * * * *

UNITED STATES PATENT AND TRADEMARK OFFICE
CERTIFICATE OF CORRECTION

PATENT NO. : 4,619,045

DATED : October 28, 1986

INVENTOR(S) : Günter Mayer

It is certified that error appears in the above-identified patent and that said Letters Patent is hereby corrected as shown below:

In column 4, line 38: delete "cap" and substitute -- gap -- therefor.

Signed and Sealed this

Twenty-third Day of December, 1986

Attest:

DONALD J. QUIGG

*Attesting Officer*     *Commissioner of Patents and Trademarks*